June 19, 1923.
L. W. HOTTEL
REENFORCED RIBBED PNEUMATIC TUBE
Filed Jan. 12, 1920
1,459,401
2 Sheets-Sheet 1
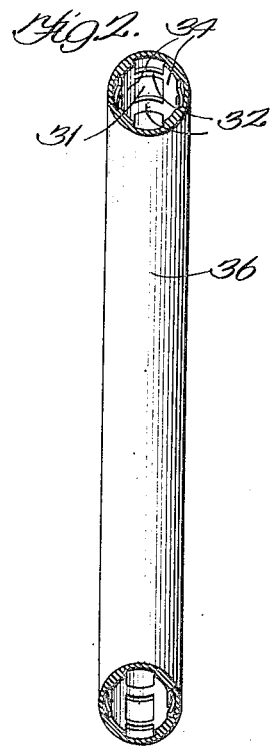
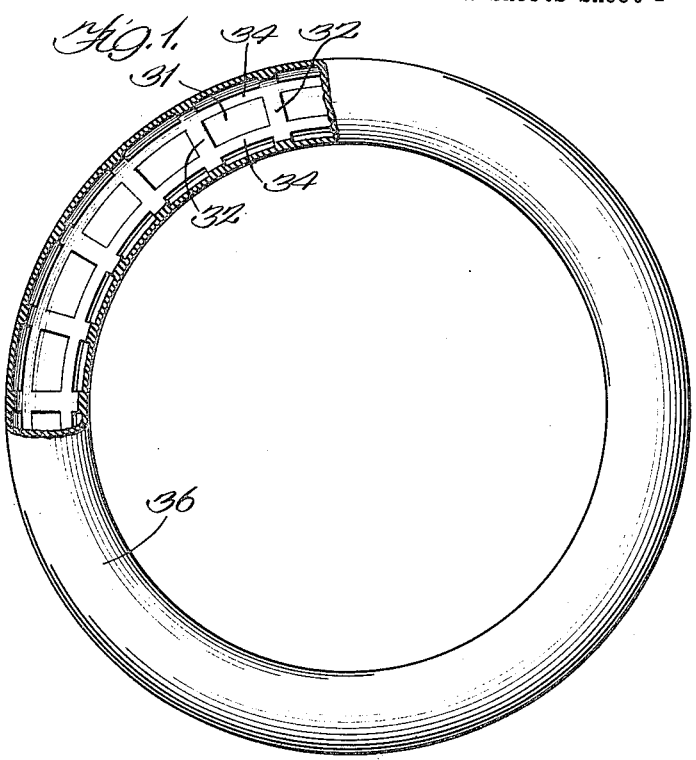
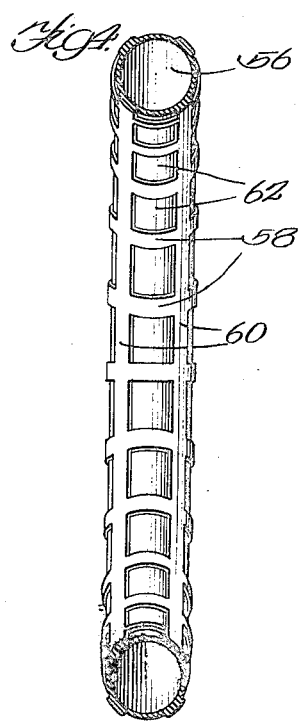
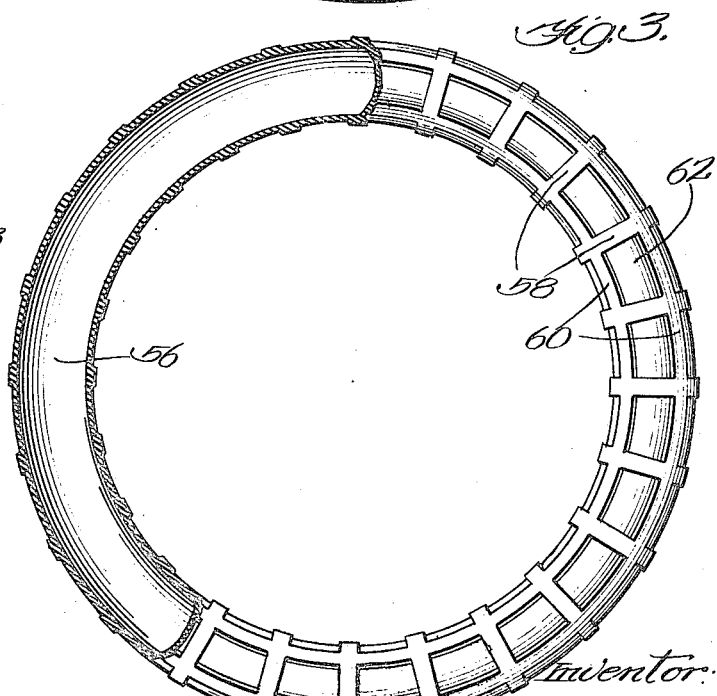

June 19, 1923.
L. W. HOTTEL
1,459,401
REENFORCED RIBBED PNEUMATIC TUBE
Filed Jan. 12, 1920 2 Sheets-Sheet 2
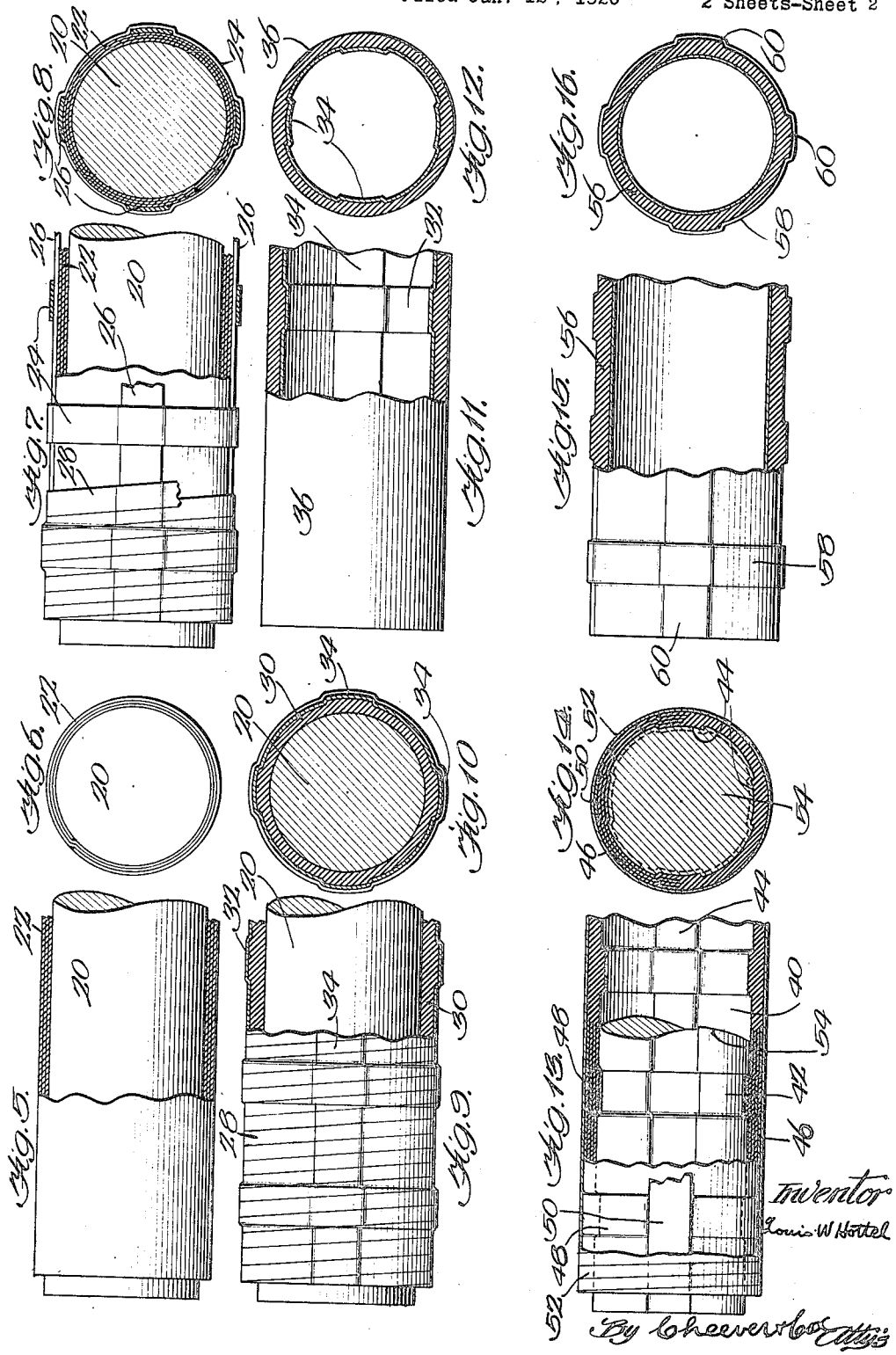

Patented June 19, 1923.

1,459,401

UNITED STATES PATENT OFFICE.

LOUIS W. HOTTEL, OF CHICAGO, ILLINOIS.

REENFORCED RIBBED PNEUMATIC TUBE.

Application filed January 12, 1920. Serial No. 350,974.

*To all whom it may concern:*

Be it known that I, LOUIS W. HOTTEL, a citizen of the United States, residing at Chicago, in the county of Cook and State of Illinois, have invented a certain new and useful Improvement in Reenforced Ribbed Pneumatic Tubes, of which the following is a specification.

This invention relates to inner tubes for pneumatic tires used upon automobiles and the like.

It is well understood that it is impossible to follow the usual method of building up sheets of thin rubber and winding them on a pole to make an inner tube without a distinct grain being formed, extending around the tube, i. e., circumferentially of the wheel, with the result that when the tube is punctured with the tube under pressure the force of the air escaping from the punctured tube is apt to split the tube for an indefinite distance, sometimes entirely around it, thus severely injuring, if not entirely ruining it. The object of this invention is to reinforce the ordinary inner tube in the process of manufacture in such manner that the grain will be broken up or interrupted so that when the tube is punctured the damage will be limited to the immediate vicinity of the object which enters and punctures the tube.

The invention consists in a tube which carries out the foregoing objects, which can be easily and cheaply made, and which is satisfactory in use. More particularly, the invention consists in the method of making the tube and in many features and details of construction hereafter more fully set forth in the specification and claims.

Referring to the drawings in which like numerals represent the same parts thruout the several views, Figure 1 is a side view partially in section, and Figure 2 is a transverse sectional view of a tube illustrating this invention in which the reinforcements are on the inside of the tube.

Figures 3 and 4 are corresponding views of a tube in which the reinforcements are on its outside.

Figure 5 is a side, and

Figure 6 an end view of the pole on which the tube is made showing the preliminary step of winding sheets of rubber thereon.

Figure 7 is a side and

Figure 8 an end view of the same parts as Figure 5 showing the process of completing the construction of the tube before vulcanizing.

Figures 9 and 10 are corresponding views showing the parts of Figures 7 and 8 vulcanized.

Figures 11 and 12 are corresponding views showing the tube turned inside out from the position of Figures 9 and 10, so that the reinforcements are on the inside of the tube ready to have its opposite ends connected to form the tire of Figure 7.

Figure 13 shows a different form of pole in which the pole is recessed with the result that the reinforcements are forced into said recesses. The part of this figure to the left of line 54 shows the making of the tire before vulcanizing, while the part at the right of line 54 shows the result of vulcanizing.

Figure 14 is an end view of Figure 13.

Figures 15 and 16 show the tube of Figures 13 and 14 turned inside out and vulcanized before connecting opposite ends to form the tire of Figure 2.

In constructing the first form of tube illustrated in Figures 5 to 12 inclusive, the operator takes the ordinary pole 20 and winds upon it circumferentially the usual sheet or sheets of thin rubber 22, until the required thickness is reached. He then places along the length of the tube a plurality of spaced circumferential bands 24 with or without a plurality of spaced longitudinal strips 26. Over these he, as in ordinary practice, winds spirally the usual cloth strips 28 to hold the parts together and drive out any air which is present between the layers of rubber. When the strips 24 and the strips 26 have been thus completely covered by the cloth 28, the structure is placed in a vulcanizing machine and converted from the condition of Figures 7 and 8 to that of Figures 9 and 10 with the result that a one piece tube is formed having a body 30 carrying circumferential ridges 32 and longitudinal intersecting ridges 34 surrounding area 31 of normal thickness rubber. The operator now removes the tube from the pole 20, turns it inside out and splices the opposite ends to form the complete tube 36 of Figures 1, 2–11 and 12.

In constructing the tube in accordance with Figures 13 to 16, a different form of pole 40 is provided, having spaced apart circumferential recesses 42 with or without a plurality of longitudinal recesses 44. In carrying out the invention with this type of pole, the pole is wound with layers of rubber 46 as before, the rubber as clearly appears in Figure 13, imbedding itself in its stretching in these recesses 42 and 44. The resulting depressions in the surface are filled with suitable circumferential bands 48 and longitudinal strips 50 of rubber, after which the cloth 52 is wound on as before and the whole vulcanized into the unitary structure shown in Figure 13 at the right of the irregular line 54. The vulcanized tube is then turned inside out as before, producing the tire 56 of Figures 3, 4, 15 and 16, having circumferential ridges 58 and longitudinal ridges 60 reinforcing and surrounding the normally thin areas 62.

The result of the operations heretofore described is that in both types of tires shown in Figures 1 and 3 the normally thin areas 31 and 62, heretofore referred to, in which the grain of the initial rubber sheets runs continuously in a given direction, are bordered and reenforced by the surrounding ribs running transversely and longitudinally of the tire which ribs in the process of manufacture and vulcanization destroy the continuity of the grain of the rubber of the main body of the tube and thus insure that in case of a puncture in the areas 31 or 62 a cut will not spread beyond the bordering reinforcements.

A tube constructed as above is therefore much more efficient in action, first, because punctures which occur in the areas 31 and 62 will not spread, and therefore only a comparatively small amount of expense is required in repairs, and second, because the reinforcing bars or ribs themselves being comparatively thick tend to resist puncture without the flexibility of the tube itself being materially impaired.

Having thus described my invention what I claim as new and desire to secure by Letters Patent, is:—

1. An inner tube for pneumatic tires provided with a plurality of reinforcing ribs each completely circumscribing one of the surfaces of the tube transversely of the latter, and a plurality of reinforcing ribs each completely circumscribing the same surface of the tube lengthwise of the latter and intersecting the transversely disposed ribs.

2. An inner tube for pneumatic tires provided with spaced endless reinforcing ribs completely circumscribing one of the surfaces of the tube transversely of the latter and disposed relatively in planes radially of the tube when said tube is inflated, and a plurality of spaced endless reinforcing ribs completely circumscribing the same surface of the tube lengthwise of the latter and intersecting the transversely disposed ribs.

In witness whereof, I have hereunto subscribed my name in the presence of a witness.

LOUIS W. HOTTEL.

Witness:
ANNA ROSENTHAL.